United States Patent
Hsu et al.

(10) Patent No.: US 7,236,354 B2
(45) Date of Patent: Jun. 26, 2007

(54) DISPLAY DEVICE AND STAND THEREOF

(75) Inventors: Shih-Lung Hsu, Taoyuan (TW); Chang-Chien Li, Taipei (TW)

(73) Assignee: BENQ Corporation, Taoyuan (TW)

( * ) Notice: Subject to any disclaimer, the term of this patent is extended or adjusted under 35 U.S.C. 154(b) by 151 days.

(21) Appl. No.: 10/799,195

(22) Filed: Mar. 12, 2004

(65) Prior Publication Data

US 2005/0002156 A1    Jan. 6, 2005

(30) Foreign Application Priority Data

Mar. 26, 2003   (TW) .............................. 92106754 A (51) Int. Cl.
   *G06F 1/16*    (2006.01)
(52) U.S. Cl. ..................................... 361/681
(58) Field of Classification Search ................ 361/681, 361/682; 248/122.1, 121, 125.9, 125.7, 127, 248/130, 151, 170, 440.1, 292.12
   See application file for complete search history.

(56) References Cited

U.S. PATENT DOCUMENTS

| | | | | |
|---|---|---|---|---|
| 487,469 | A * | 12/1892 | Burgess | ...................... 182/170 |
| 6,191,940 | B1 * | 2/2001 | Ma | .............................. 361/681 |
| 6,493,216 | B1 * | 12/2002 | Lin | ............................. 361/681 |
| 6,615,523 | B1 * | 9/2003 | Curbelo et al. | .......... 40/606.15 |
| 6,734,922 | B1 | 5/2004 | Seo | |
| 6,768,635 | B2 * | 7/2004 | Lai et al. | ..................... 361/680 |
| 6,788,527 | B2 * | 9/2004 | Doczy et al. | ............... 361/680 |
| 2002/0122291 | A1 * | 9/2002 | Hubbard | ..................... 361/683 |
| 2003/0021083 | A1 * | 1/2003 | Landry et al. | .............. 361/683 |

* cited by examiner

*Primary Examiner*—Lisa Lea-Edmonds
*Assistant Examiner*—Ingrid Wright
(74) *Attorney, Agent, or Firm*—Quintero Law Office (57) ABSTRACT

A stand for supporting a display device. The stand includes a fixing plate, a hinge structure and a supporting structure. The fixing plate is connected to the display device. The hinge structure is connected to the fixing plate and has a hinge body. The supporting structure is connected to the hinge structure and has a first supporting element and a second supporting element. The first supporting element is rotatably connected to the second supporting element. The distance between the bottoms of the first and second supporting elements changes when either of the first and second supporting elements rotates.

20 Claims, 14 Drawing Sheets

DISPLAY DEVICE AND STAND THEREOF

BACKGROUND OF THE INVENTION

1. Field of the Invention

The present invention relates to a stand, and in particular to a stand that provides stable support in a portable mode and is easily converted to a desk top mode.

2. Description of the Related Art

Generally speaking, there are many types of conventional stands to support electronic devices such as an LCD TV or LCD monitor.

Figure 1:
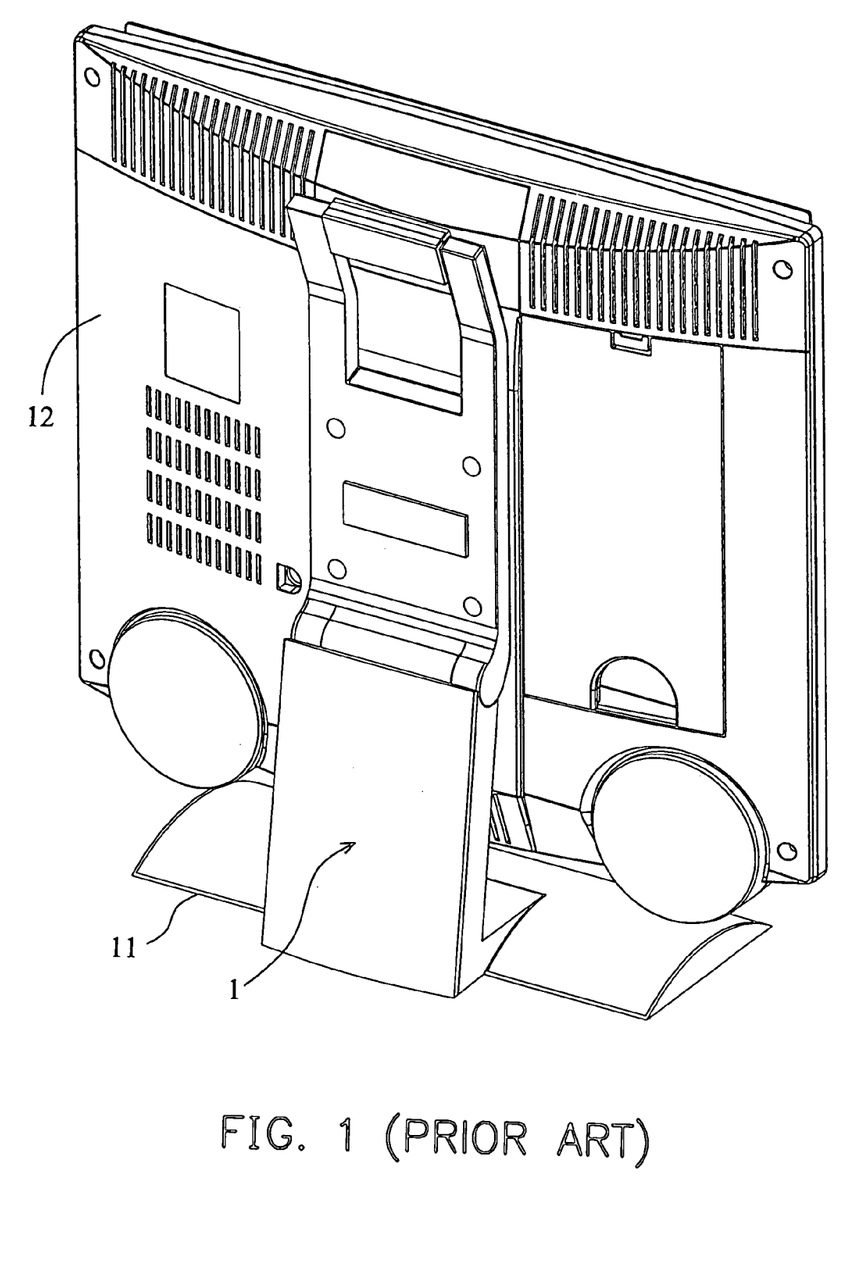
FIG. 1 shows a conventional fixed-type stand.
Figure 2:
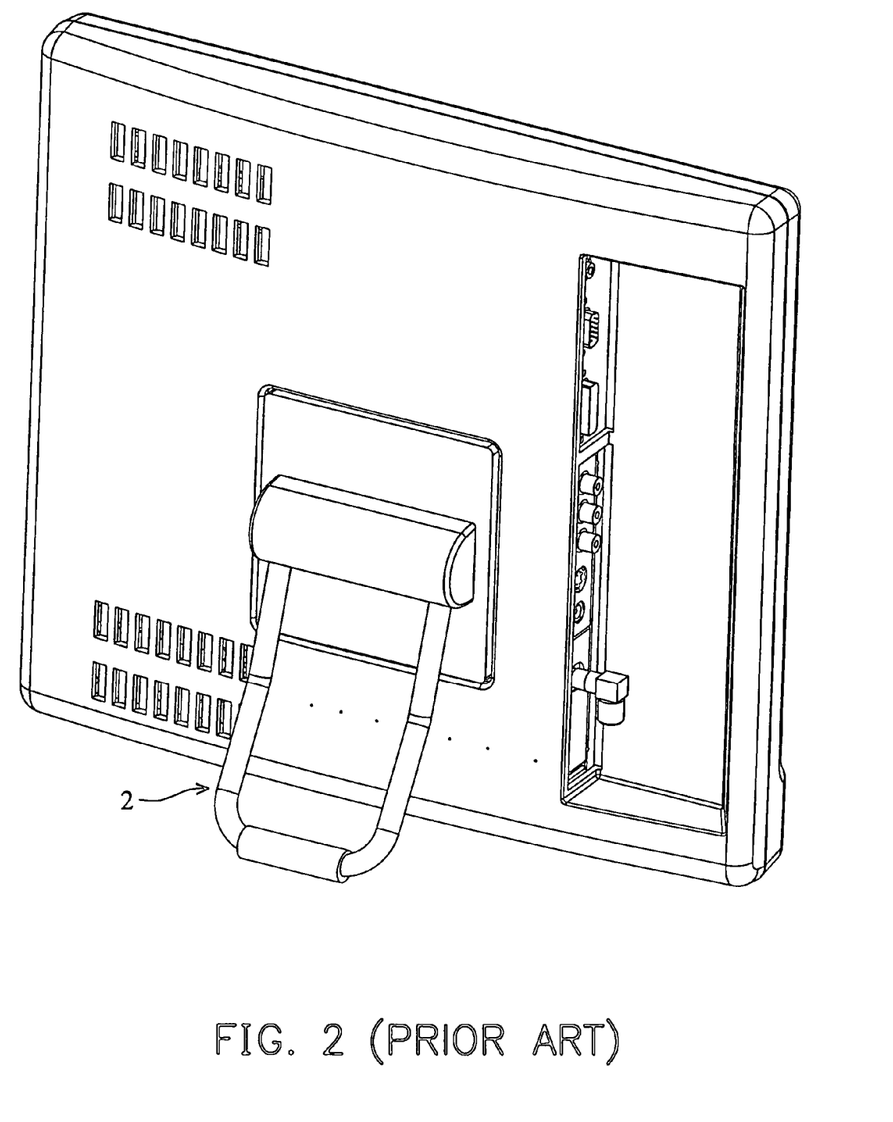
FIG. 2 shows a conventional simplified-type stand.

As shown in FIG. 1, a conventional fixed-type stand 1 can provide stable support for a display 12. Nevertheless, a fixed-type stand 1 occupies a large space, and may be inconvenient to store or transport. As shown in FIG. 2, a conventional simplified-type stand 2 does not include a base structure. Thus, the simplified-type stand 2 occupies less space than the fixed-type stand 1 but does not provide stable support.

Hence, there is a need to provide a stand to overcome the aforementioned problems. The stand provides portability and adequate support.

SUMMARY OF THE INVENTION

Accordingly, an object of the invention is to provide a stand to support a display device. The stand comprises a fixing plate, a hinge structure and a supporting structure. The fixing plate is connected to the display device. The hinge structure is connected to the fixing plate and has a hinge body. The supporting structure is connected to the hinge structure and has a first supporting element and a second supporting element. The first supporting element is rotatably connected to the second supporting element. The distance between the bottoms of the first and second supporting elements changes when either of the first and second supporting elements rotates.

Accordingly, the hinge structure further comprises a first hinge, a second hinge, a first fixing portion and a second fixing portion. The first hinge is connected to the first fixing portion and hinge body. The second hinge is connected to the second fixing portion and hinge body. The first and second fixing portions are fixed to the fixing plate.

Accordingly, the stand further comprises a base having a receiving portion. The first and second supporting elements are received in the receiving portion when the base is connected to the first and second supporting elements.

Accordingly, the stand further comprises a lock structure disposed in the receiving portion of the base to position the first and second supporting elements in the receiving portion, and release the first and second supporting elements from the receiving portion.

Accordingly, the lock structure further comprises a button element and an engaging element. The button element is slidably disposed on the engaging element. The first and second supporting elements engage the engaging element and disengage from the engaging element by means of the button element.

Accordingly, the first supporting element and second supporting element further comprise a first engaging portion and a second engaging portion, respectively, to engage the engaging element.

Accordingly, the first supporting element and second supporting element further comprise a first toothed portion and a second toothed portion, respectively. The first toothed portion engages the second toothed portion such that the first supporting element rotates with respect to the second supporting element.

Accordingly, the stand further comprises a first cushion and a second cushion disposed on the bottoms of the first and second supporting elements, respectively.

Accordingly, the stand further comprises a first cover covering the hinge body, first toothed portion, second toothed portion and fixing plate.

Accordingly, the stand further comprises a second cover covering the hinge body.

Accordingly, the hinge body further comprises a first fixed pin and a second fixed pin. The first and second supporting elements pivot to the first and second fixed pins, respectively.

Accordingly, the stand further comprises at least one first buffer disposed in the receiving portion of the base to protect the supporting structure.

Preferably, the first buffer is made of rubber.

Accordingly, the stand further comprises a bottom plate disposed under the base. The lock structure is disposed in the receiving portion of the base and on the bottom plate.

Accordingly, the stand further comprises at least one second buffer disposed under the bottom plate.

Preferably, the second buffer is made of rubber.

Another object of the invention is to provide a display device. The display device comprises a main body and a stand. The stand is connected to the main body and has a first supporting element and a second supporting element. The bottoms of the first supporting element, second supporting element and main body form a plane and the main body is supported thereon when the first supporting element is separated from the second supporting element by a predetermined distance.

Accordingly, the display device further comprises a hinge body disposed on the main body. The stand is connected to the main body by means of the hinge body. The hinge body rotates in a direction away from the main body to change the angle between the stand and main body.

Accordingly, the display device further comprises a base having a receiving portion. The first and second supporting elements are accommodated in the receiving portion when the base is connected to the stand.

Accordingly, the display device further comprises a lock structure disposed in the receiving portion of the base to position the first and second supporting elements in the receiving portion and release the first and second supporting elements from the receiving portion.

Accordingly, the lock structure further comprises a button element and an engaging element. The button element slides and is disposed on the engaging element. The first and second supporting elements engage the engaging element and disengage from the engaging element by means of the button element.

Accordingly, the first supporting element and second supporting element further comprise a first engaging portion and a second engaging portion, respectively, to engage the engaging element.

Accordingly, the first supporting element and second supporting element further comprise a first toothed portion and a second toothed portion, respectively. The first toothed portion engages the second toothed portion such that the first supporting element rotates with respect to the second supporting element.

Accordingly, the display device further comprises a first cushion and a second cushion disposed on the bottoms of the first and second supporting elements, respectively.

Accordingly, the display device further comprises a first cover covering the hinge body, first toothed portion and second toothed portion.

Accordingly, the display device further comprises a second cover covering the hinge body.

Accordingly, the hinge body further comprises a first fixed pin and a second fixed pin. The first and second supporting elements pivot to the first and second fixed pins, respectively.

Accordingly, the display device further comprises at least one first buffer disposed in the receiving portion of the base to protect the stand.

Preferably, the first buffer is made of rubber.

Accordingly, the display device further comprises a bottom plate disposed under the base. The lock structure is disposed in the receiving portion of the base and on the bottom plate.

Accordingly, the display device further comprises at least one second buffer disposed under the bottom plate.

Preferably, the second buffer is made of rubber.

Accordingly, the main body further comprises a sliding groove. The first and second supporting elements are disposed in the sliding groove and slide therein. The stand is in a received condition when the first and second supporting elements meet. The stand is in a supporting condition when the first and second supporting elements are separated.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 3:
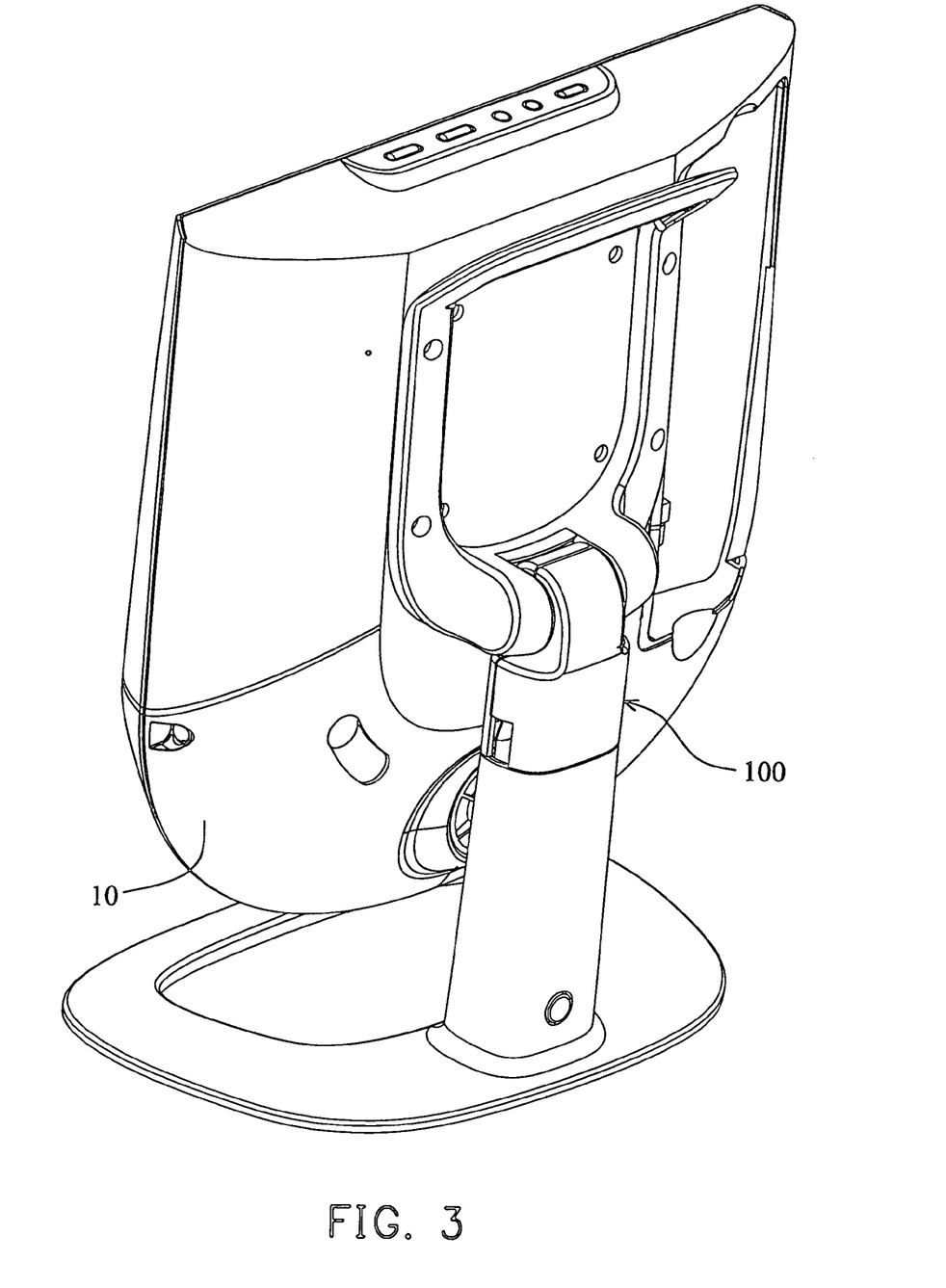
FIG. 3 is a perspective view showing the stand of the first embodiment of the invention in a received condition.
Figure 4:
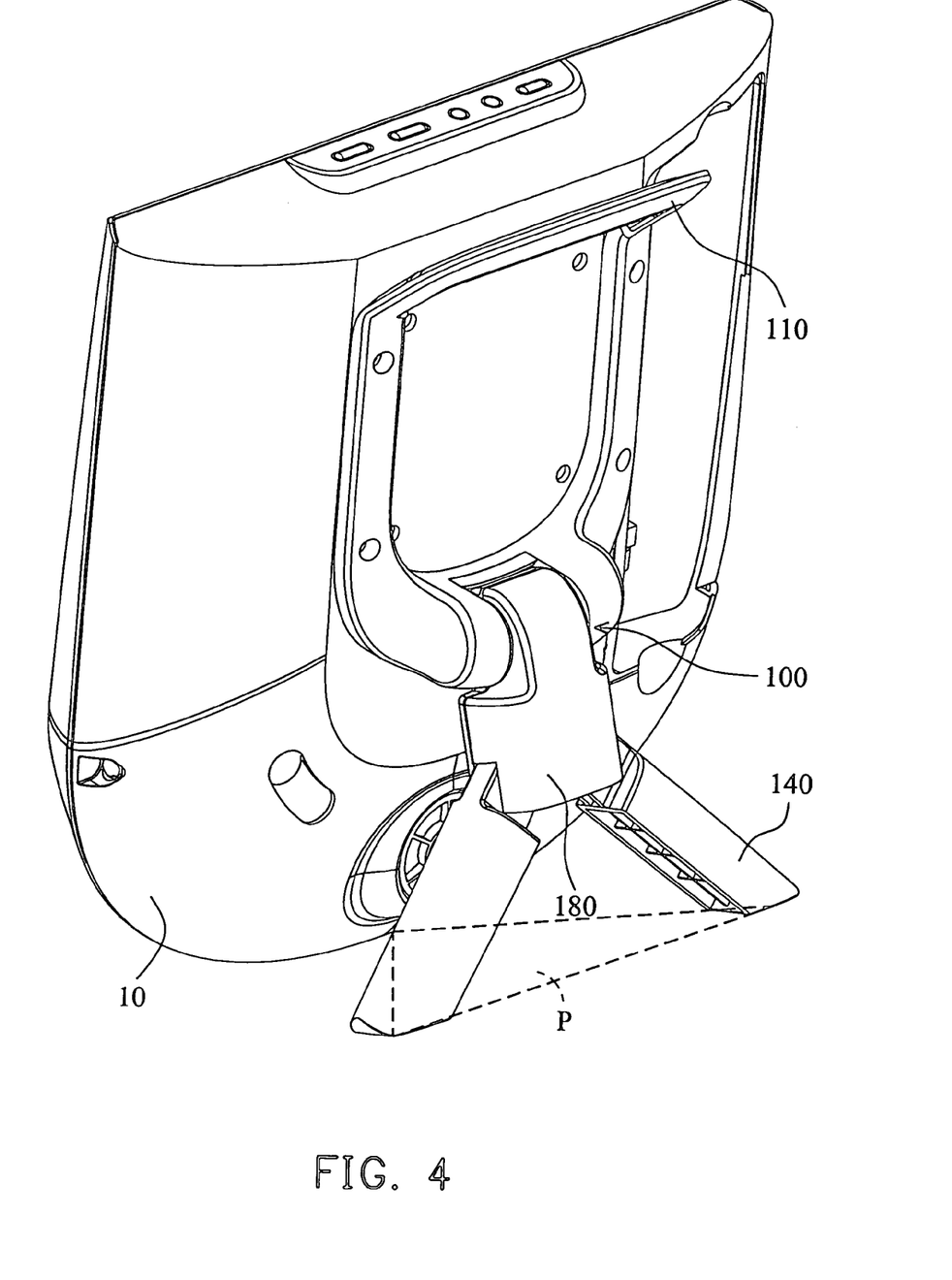
FIG. 4 is a perspective view showing the stand of the first embodiment of the invention in an expanded condition.

Referring to FIG. 3 and FIG. 4, the stand 100 supports a display device 10 having a curved bottom. The display device 10 may be an LCD TV or an LCD monitor.

Figure 5:
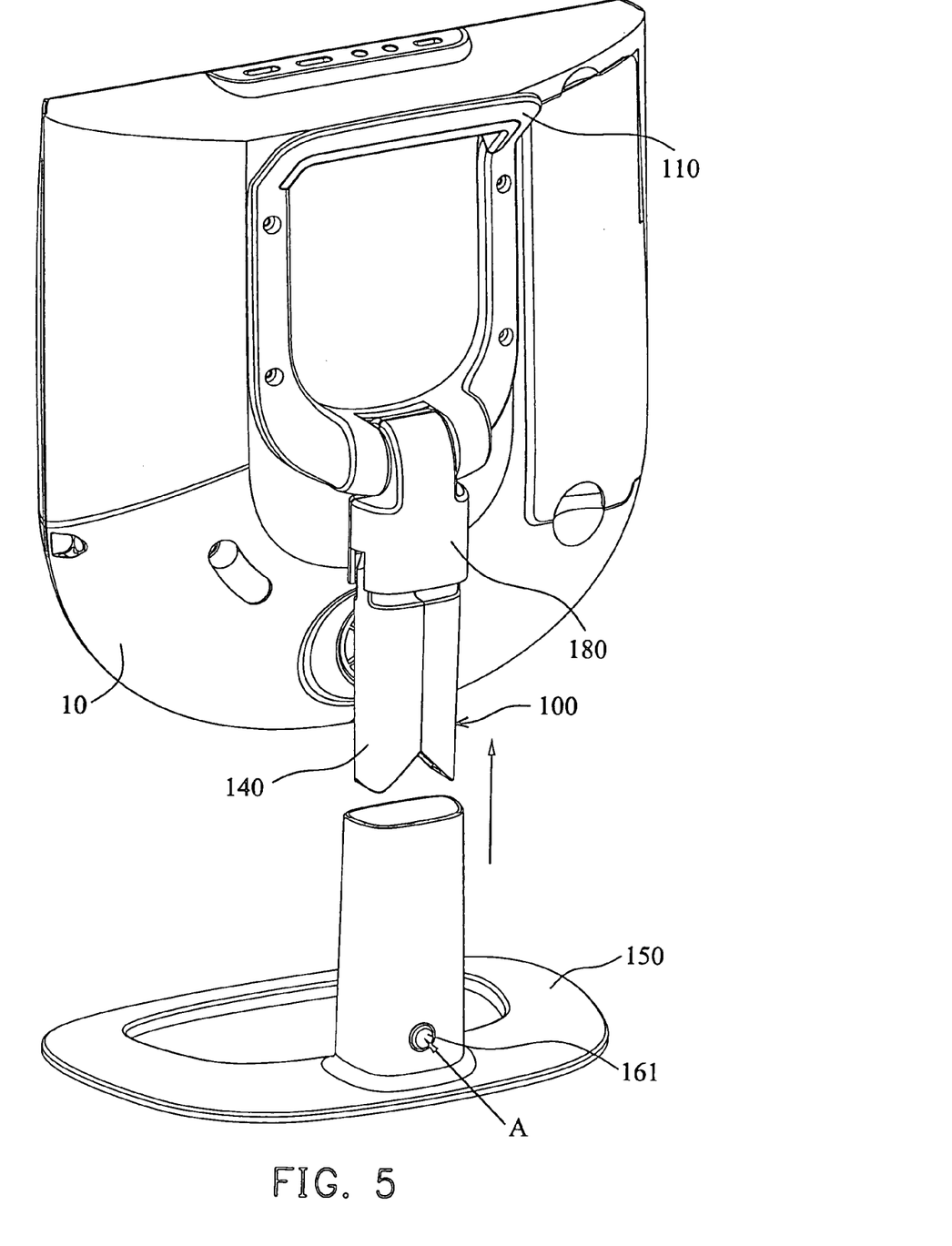
FIG. 5 is a perspective view showing the supporting structure of the stand of the first embodiment of the invention separated from the base.
Figure 6:
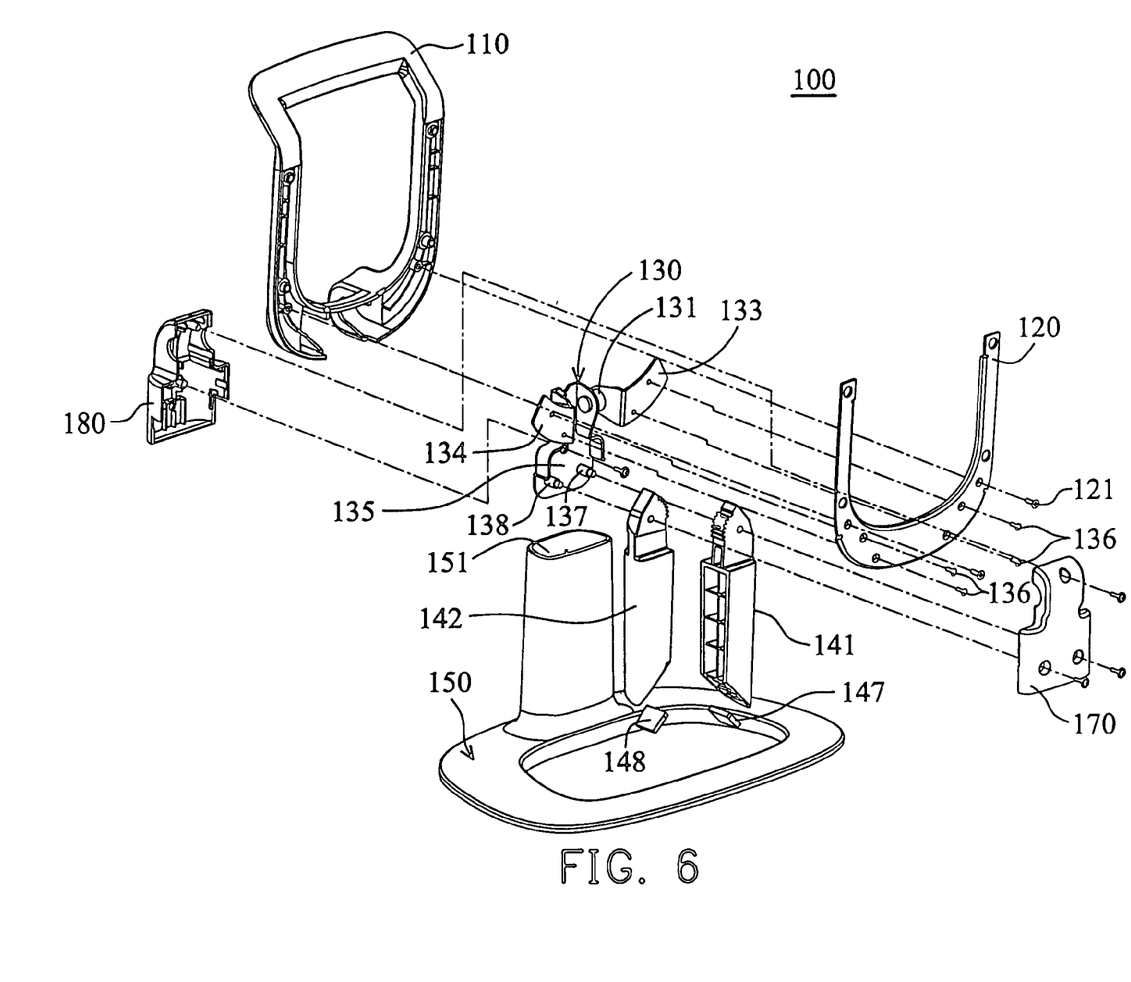
FIG. 6 is a perspective exploded view showing the stand of the first embodiment of the invention.

Referring to FIG. 5 and FIG. 6, the stand 100 comprises a handle 110, a fixing plate 120, a hinge structure 130 and a supporting structure 140. The fixing plate 120 is connected to the handle 110 by bolts 121. The hinge structure 130 is rotatably connected to the fixing plate 120. The supporting structure 140 is rotatably connected to the hinge structure 130.

Figure 7:
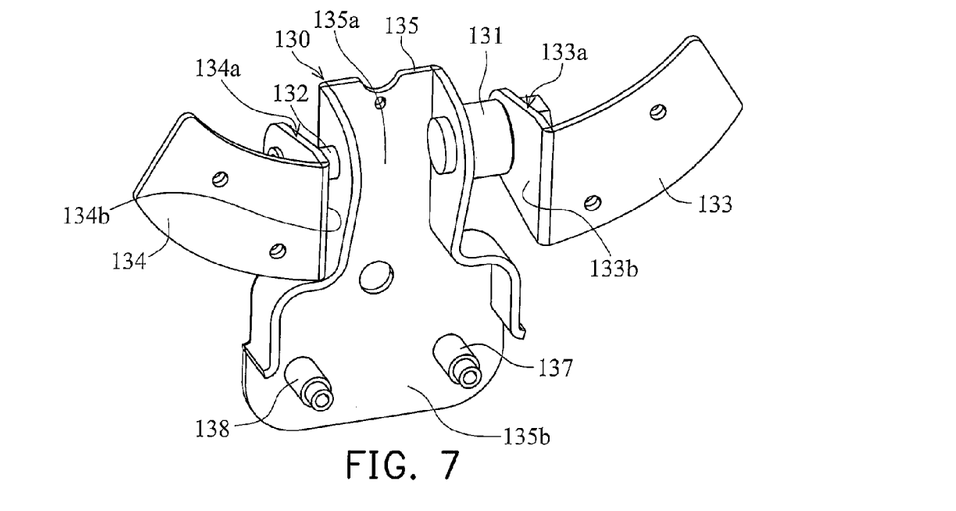
FIG. 7 is a perspective view showing the hinge structure of the stand of the first embodiment of the invention.

Referring to FIG. 7, the hinge structure 130 has a first hinge 131, a second hinge 132, a first fixing portion 133, a second fixing portion 134 and a hinge body 135. The first hinge 131 is connected to the first fixing portion 133 and hinge body 135. The second hinge 132 is connected to the second fixing portion 134 and hinge body 135. The first fixing portion 133 and second fixing portion 134 are fixed to the fixing plate 120 by bolts 136. When the first fixing portion 133 and second fixing portion 134 of the hinge structure 130 are fixed to the fixing plate 120, the hinge body 135 can rotate with respect to the first fixing portion 133 and second fixing portion 134.

Moreover, the hinge body 135 has a hinge upper portion 135a and a hinge lower portion 135b. The hinge upper portion 135a is rotatably connected to the monitor. Additionally, as shown in FIG. 7, a first protruded portion 133a is formed on the monitor and has a first lateral surface 133b, and a second protruded portion 134a is formed on the monitor and has a second lateral surface 134b. The hinge upper portion 135a is rotatably connected to the first lateral surface 133b and second lateral surface 134b.

Figure 8:
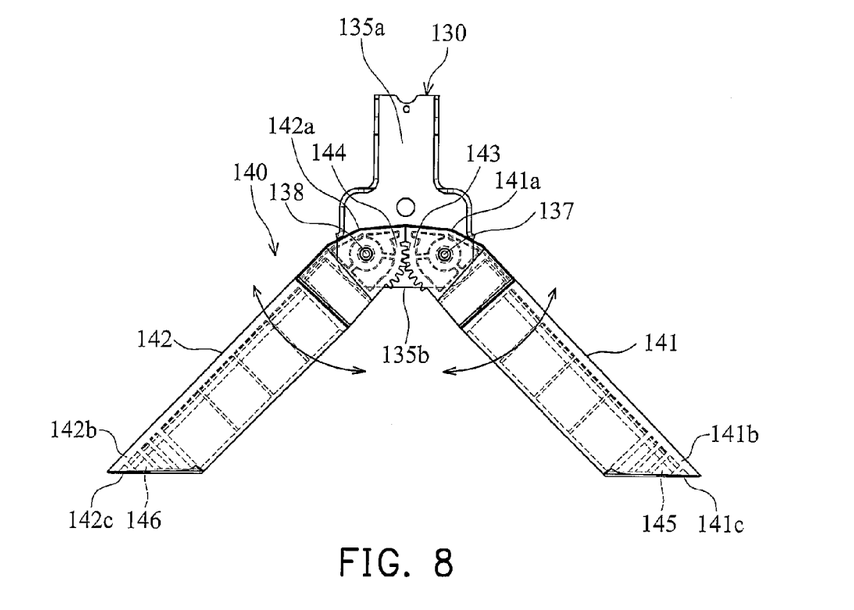
FIG. 8 is a plane view showing the hinge structure and supporting structure of the stand of the first embodiment of the invention.

Referring to FIG. 8, the supporting structure 140 has a first supporting element 141 and a second supporting element 142. The first supporting element 141 is rotatably connected to the second supporting element 142. Specifically, a first toothed portion 143 and a second toothed portion 144 are formed on the first supporting element 141 and second supporting element 142, respectively. The first toothed portion 143 engages with the second toothed portion 144 such that the first supporting element 141 rotates with respect to the second supporting element 142.

Additionally, as shown in FIG. 6, FIG. 7 and FIG. 8, the hinge body 135 of the hinge structure 130 has a first fixed pin 137 and a second fixed pin 138. The first supporting element 141 and second supporting element 142 pivot to the first fixed pin 137 and second fixed pin 138, respectively. Thus, when the first supporting element 141 and second supporting element 142 rotate relatively, the first supporting element 141 rotates at the first fixed pin 137 and the second supporting element 142 rotates at the second fixed pin 138.

Figure 9:
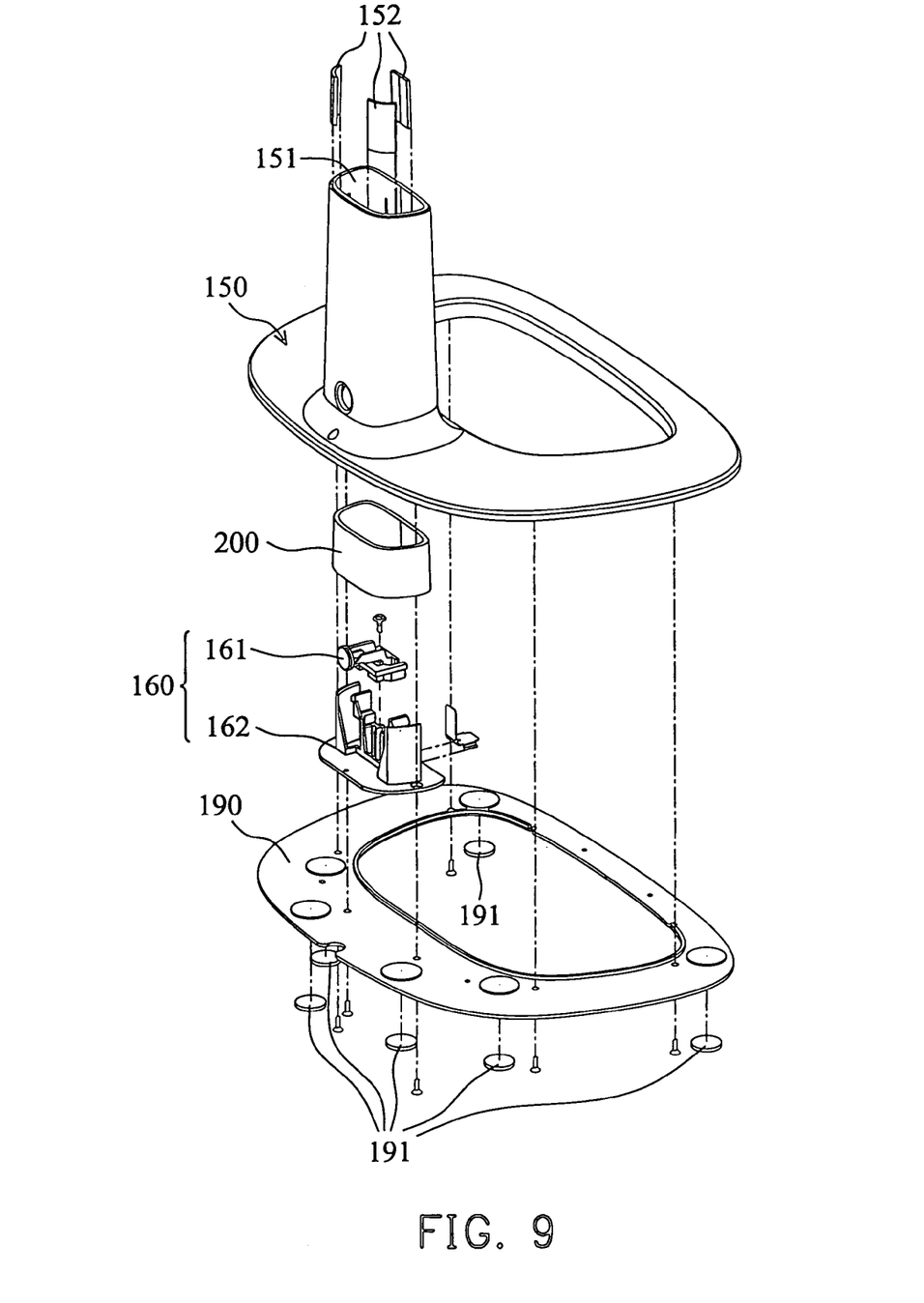
FIG. 9 is a partial perspective exploded view showing the stand of the first embodiment of the invention.

As shown in FIG. 5, FIG. 6 and FIG. 9, the stand 100 can be connected to a base 150 to support the display device 10. The base 150 has a receiving portion 151. When the first and second supporting elements 141, 142 of the supporting structure 140 meet, the first and second supporting elements 141, 142 can be received in the receiving portion. 151 and the stand 100 supports the display device 10.

Figure 10:
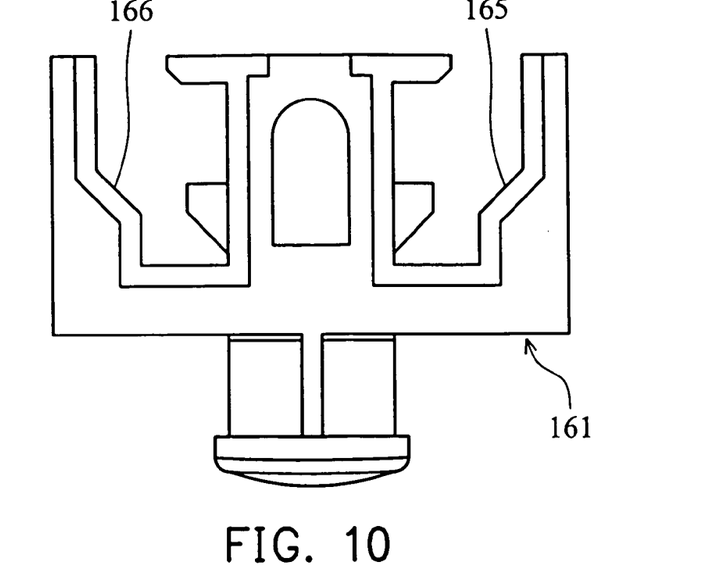
FIG. 10 is a plane view showing the button element of the stand of the first embodiment of the invention.
Figure 11:
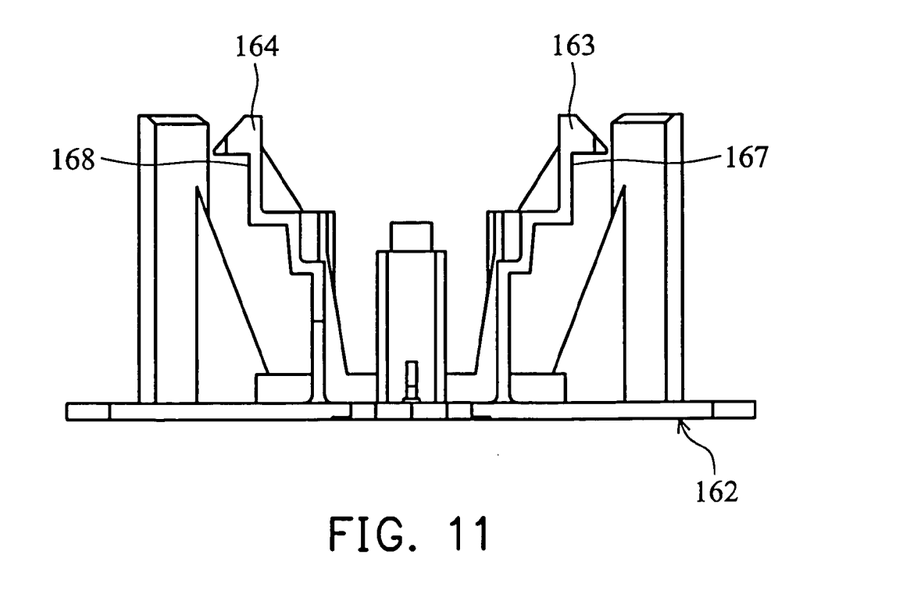
FIG. 11 is a plane view showing the engaging element of the stand of the first embodiment of the invention.

Additionally, as shown in FIG. 9, FIG. 10 and FIG. 11, a lock structure 160 is disposed in the receiving portion 151 of the base 150. The lock structure 160 is composed of a button element 161 and an engaging element 162. The button element 161 is slidably disposed on the engaging element 162.

Figure 12:
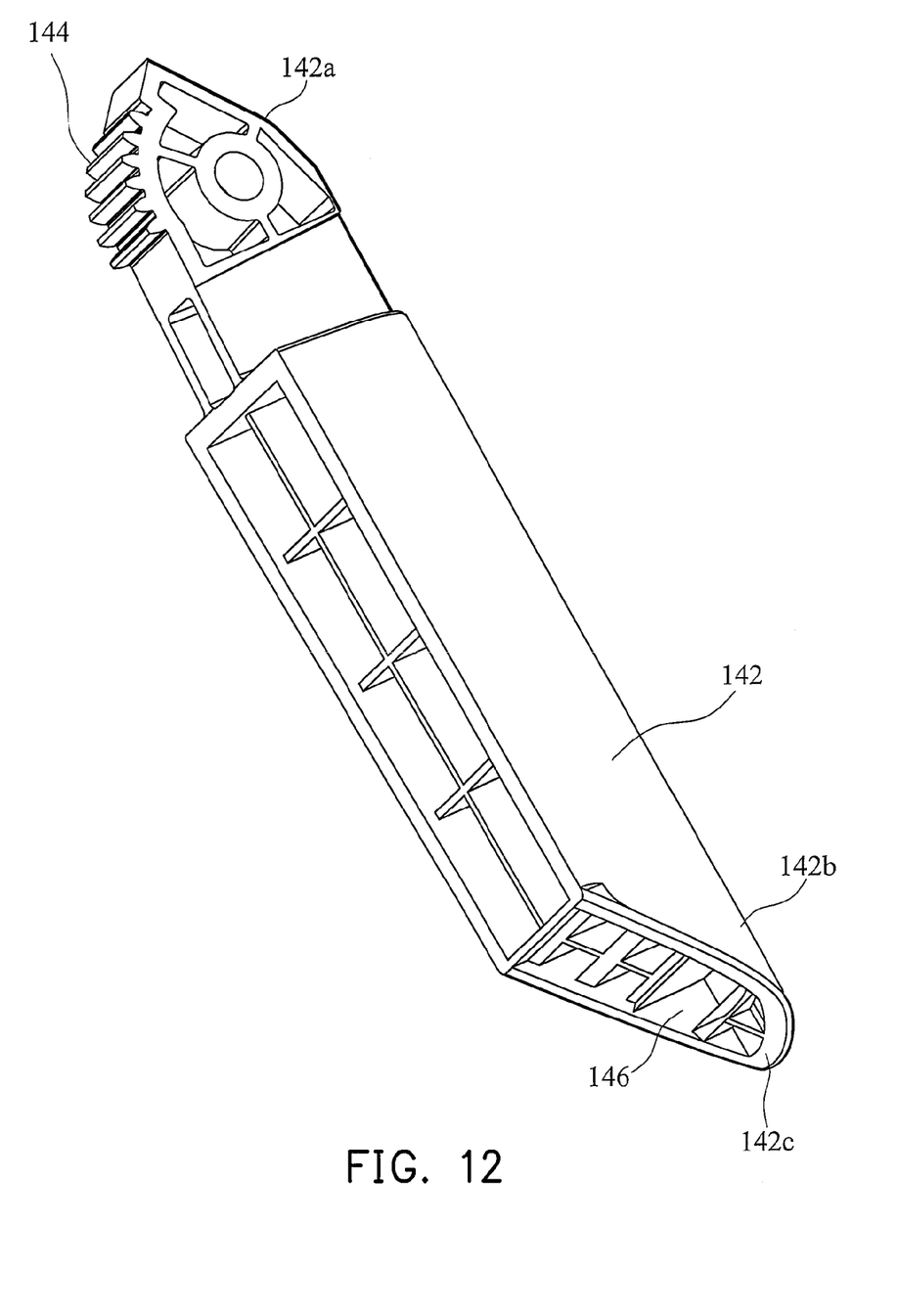
FIG. 12 is a perspective view showing the first supporting element of the stand of the first embodiment of the invention.
Figure 13:
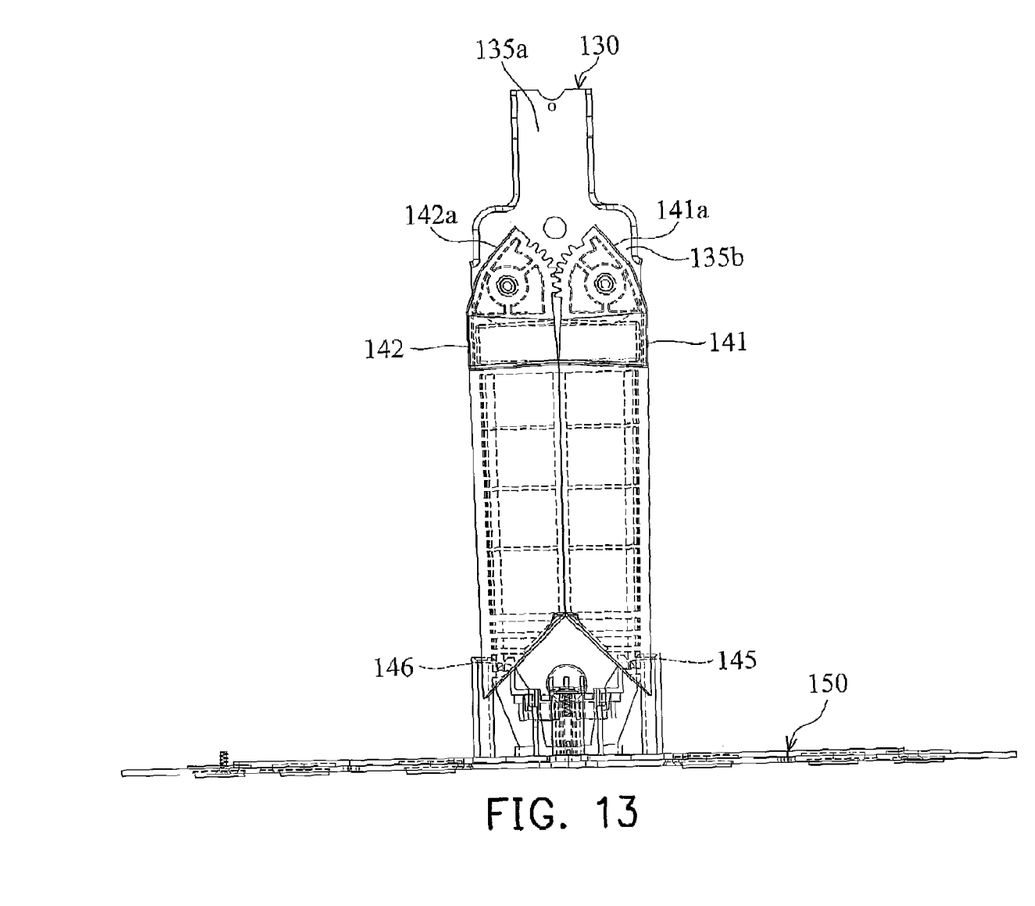
FIG. 13 showing the supporting structure of the first embodiment of the invention engaged in a lock structure.

Referring to FIG. 8 and FIG. 12, the first supporting element 141 and second supporting element 142 have a first engaging portion 145 and a second engaging portion 146, respectively. When the first supporting element 141 and second supporting element 142 meet and are received in the receiving portion 151, the first engaging portion 145 and second engaging portion 146 engage a first protrusion 163 and a second protrusion 164 of the engaging element 162, respectively, as shown in FIG. 11 and FIG. 13.

Moreover, the first supporting element 141 has a first rotating end 141a, a first free end 141b, and a first inclined surface 141c. The second supporting element 142 has a second rotating end 142a, a second free end 142b, and a second inclined surface 142c. The first rotating end 141a and second rotating end 142a are rotatably connected to the hinge lower portion 135b. Specifically, hinge lower portion 135b is wider than the hinge upper portion 135a to accommodate the first rotating end 141a and second rotating end 142a. The first inclined surface 141c and second inclined surface 142c respectively correspond to the first engaging portion 145 and second engaging portion 146.

Figure 14:
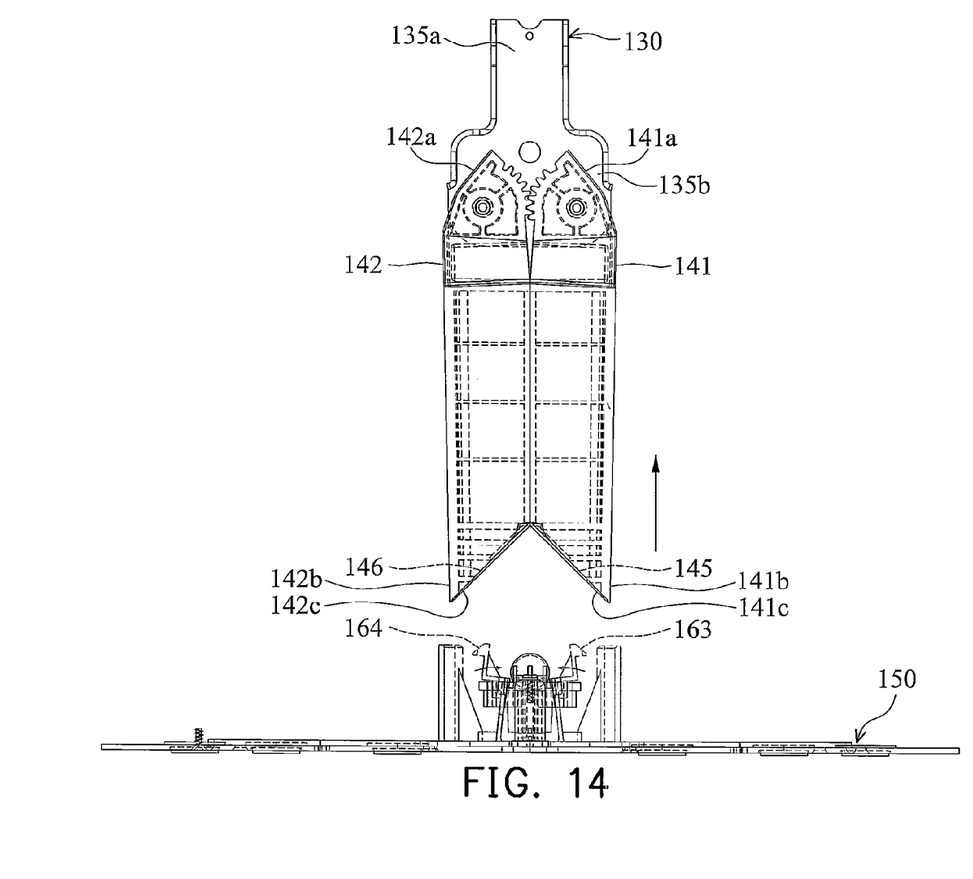
FIG. 14 showing the supporting structure of the first embodiment of the invention separated from the lock structure.

Accordingly, the button element 161 can be pressed in the direction shown by arrow A in FIG. 5 to disengage the supporting structure 140, or the first supporting element 141 and second supporting element 142 from the engaging element 162. At this time, as shown in FIG. 10, FIG. 11 and FIG. 14, a first retardant portion 165 and a second retardant portion 166 of the button element 161 are moved toward the inside of the receiving portion 151 to compress a third retardant portion 167 and a fourth retardant portion 168 of the engaging element 162. The first protrusion 163 and second protrusion 164 of the engaging element 162 are deflected inward, such that the first engaging portion 145 of the first supporting element 141 and the second engaging portion 146 of the second supporting element 142 disengage from the first protrusion 163 and second protrusion 164 of the engaging element 162, respectively. At this time, the first supporting element 141 and second supporting element 142 are completely separated from the receiving portion 151 of the base 150.

Additionally, as shown in FIG. 5 and FIG. 6, the stand 100 has a first cover 170 and a second cover 180. The first cover 170 covers the hinge body 135, first toothed portion 143, second toothed portion 144 and fixing plate 120. The second cover 180 covers the hinge body 135.

As shown in FIG. 9, a plurality of first buffers 152 made of rubber are disposed in the receiving portion 151 of the base 150. When the first supporting element 141 and second supporting element 142 are received in the receiving portion 151, the first buffers 152 can prevent the first supporting element 141 and second supporting element 142 from directly impacting the inner wall of the receiving portion 151.

In addition, a bottom plate 190 is disposed under the base 150. The lock structure 160 is disposed in the receiving portion 151 of the base 150 and on the bottom plate 190. Meanwhile, the lock structure 160 is embraced by an annular rubber element 200. A plurality of second buffers 191 made of rubber are disposed under the bottom plate 190. The second buffers 191 can provide the stand 100 with excellent shock absorption.

As shown in FIG. 6, a first cushion 147 and a second cushion 148 are respectively disposed on the bottoms of the first supporting element 141 and second supporting element 142 to protect the bottoms thereof.

Figure 15:
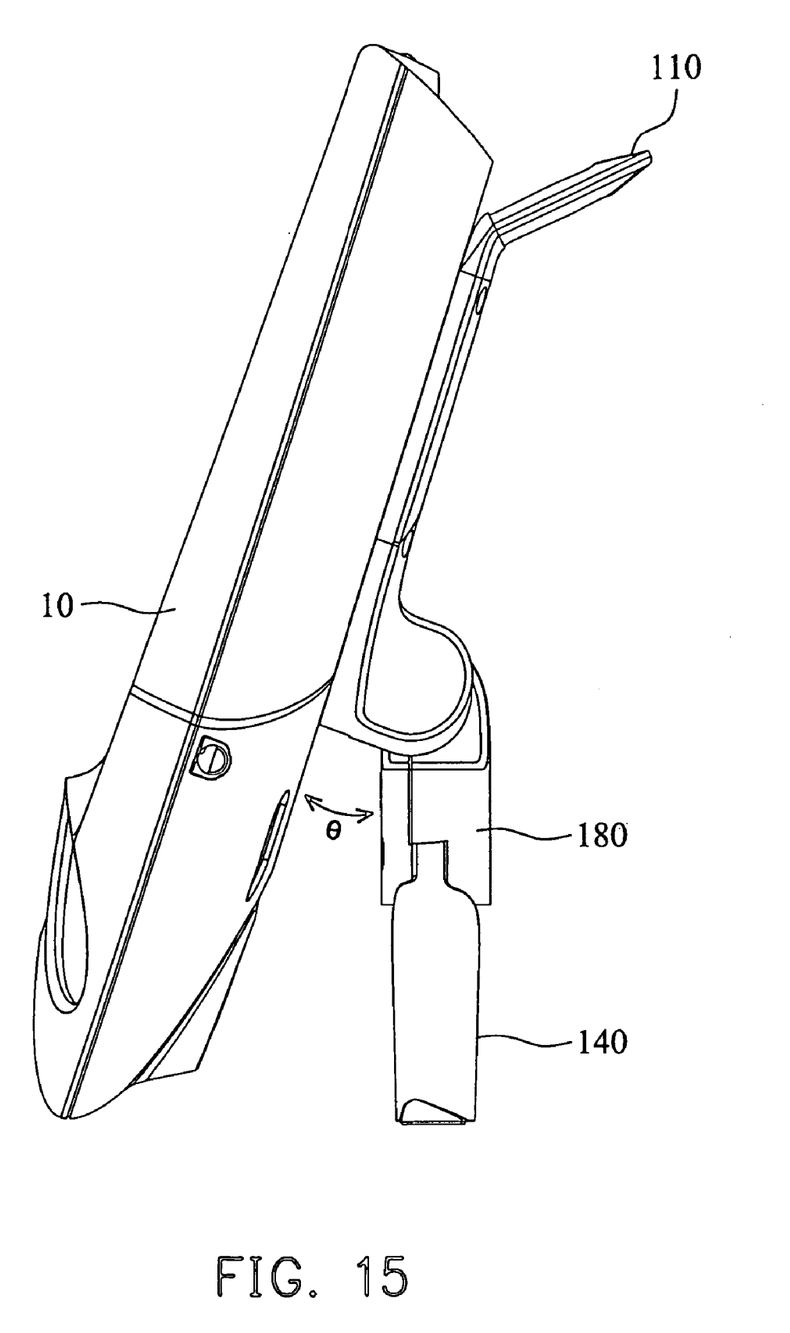
FIG. 15 is a side view according to FIG. 4.

Accordingly, when the stand 100 is received in the receiving portion 151 of the base 150, the display device 10 is supported by the stand 100, as shown in FIG. 3. The button element 161 can be pressed in the direction shown by arrow A in FIG. 5 to disengage the supporting structure 140 or the first supporting element 141 and second supporting element 142 from the engaging element 162. After the supporting structure 140 is removed from the base 150, the first supporting element 141 and second supporting element 142 can be separated by a predetermined distance. Then, the hinge structure 130 can be turned to separate the first supporting element 141 and second supporting element 142 from the display device 10 by a predetermined angle θ, as shown in FIG. 4 and FIG. 15. At this time, the bottoms of the first supporting element 141, second supporting element 142 and display device 10 form a virtual plane P and the display device 10 is supported thereon. In addition, the display device 10 can be transported by means of the handle 110.

Second Embodiment

Figure 16A:
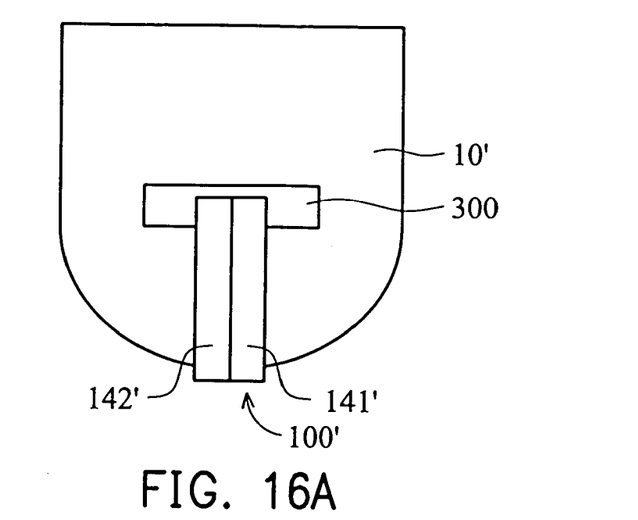
FIG. 16A is a schematic view showing the stand of the second embodiment of the invention in a received condition.
Figure 16B:
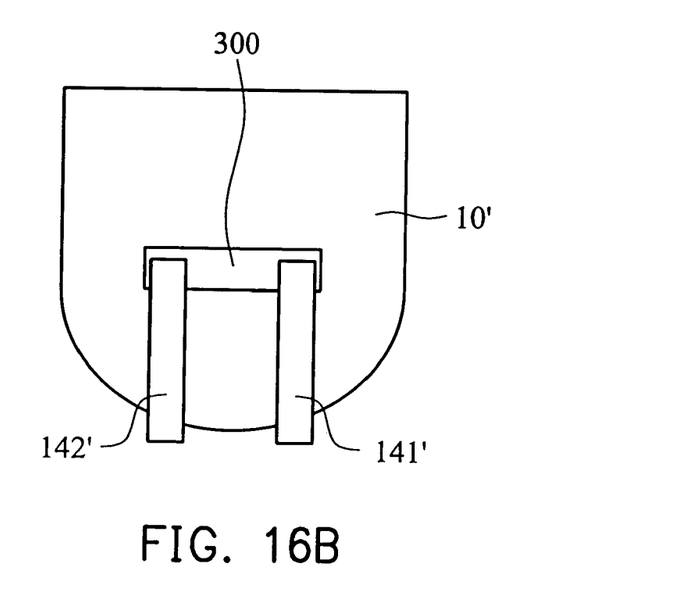
FIG. 16B is a schematic view showing the stand of the second embodiment of the invention in a supporting condition.

Referring to FIG. 16A and FIG. 16B, the stand 100' comprises a first supporting element 141' and a second supporting element 142'. A sliding groove 300 is formed on the back of the display device 10'. The first supporting element 141' and second supporting element 142' are disposed in the sliding groove 300 and slide therein. Similarly, the first supporting element 141' and second supporting element 142' are separated from the back of the display device 10' by a predetermined angle θ (not shown in FIG. 16A and FIG. 16B).

Accordingly, when the first supporting element 141' and second supporting element 142' meet, the stand 100' is in a received condition, as shown in FIG. 16A. On the other hand, when the first supporting element 141' and second supporting element 142' are separated by a predetermined distance, the stand 100' is in a supporting condition, as shown in FIG. 16B. At this time, the bottoms of the first supporting element 141', second supporting element 142' and display device 10' form a virtual plane (not shown) and the display device 10' is supported thereon.

In conclusion, the stands 100, 100' of the invention have the following advantages.

(1) The stands 100, 100' are easily assembled.

(2) When the stands 100, 100' are transported, the space occupied thereby or size of the package is reduced. Thus, the cost in transporting the stands 100, 100' is reduced.

(3) The stands 100, 100' can be placed anywhere and provide stable support.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a monitor;
   a base having a receiving portion;
   a hinge body having a hinge upper portion and a hinge lower portion, the hinge upper portion rotatably connected to the monitor; and
   a stand having a first supporting element and a second supporting element, the first supporting element having a first rotating end and a first free end, the second supporting element having a second rotating end and a second free end, the first and second rotating ends rotatably connected to the hinge lower portion;
   wherein, when the first and second supporting elements rotate away from each other, the distance between the first free end and the second free end is greater than the opening size of the receiving portion;
   wherein, when the first and second supporting elements rotate toward each other, the distance between the first free end and the second free end is less than the opening size of the receiving portion, so that the stand is capable of being received in the receiving portion.

2. The display device as claimed in claim 1, wherein the first free end and the second free end respectively have a first inclined surface and a second inclined surface;
   wherein, when the first and second supporting elements rotate away from each other, the angle between the first and second supporting elements increases to a predetermined angle;
   wherein the first and second inclined surfaces stably contact a horizontal surface when the first and second supporting elements are disposed with the predetermined angle.

3. The display device as claimed in claim 2, further comprising:
   a first protruded portion formed on the monitor and having a first lateral surface; and
   a second protruded portion formed on the monitor and having a second lateral surface, wherein the hinge upper portion is rotatably connected to the first and second lateral surfaces.

4. The display device as claimed in claim 3, wherein the hinge lower portion is wider than the hinge upper portion to accommodate the first and second rotating ends.

5. The display device as claimed in claim 1, further comprising:
   a first protruded portion formed on the monitor and having a first lateral surface; and
   a second protruded portion formed on the monitor and having a second lateral surface, wherein the hinge upper portion is rotatably connected to the first and second lateral surfaces.

6. The display device as claimed in claim 5, wherein the hinge lower portion is wider than the hinge upper portion to accommodate the first and second rotating ends.

7. The display device as claimed in claim 1, wherein the hinge lower portion is wider than the hinge upper portion to accommodate the first and second rotating ends.

8. The display device as claimed in claim 7, wherein the first free end and the second free end respectively have a first inclined surface and a second inclined surface;
   wherein, when the first and second supporting elements rotate away from each other, the angle between the first and second supporting elements increases to a predetermined angle;
   wherein the first and second inclined surfaces stably contact a horizontal surface when the first and second supporting elements are disposed with the predetermined angle.

9. The display device as claimed in claim 1, wherein the first supporting element comprises a first toothed portion, the second supporting element comprises a second toothed portion, the first toothed portion engages the second toothed portion such that the first supporting element rotates with respect to the second supporting element, the first toothed portion has at least one first tooth perpendicular to one side of the first supporting element, the second toothed portion has at least one second tooth perpendicular to one side of the second supporting element, the side of the first supporting element is separated from that of the second supporting element when the first and second supporting elements rotate away from each other, and the side of the first supporting element abuts that of the second supporting element when the stand is capable of being received in the receiving portion.

10. The display device as claimed in claim 1, further comprising a lock structure disposed in the receiving portion of the base to position the first and second supporting elements in the receiving portion and release the first and second supporting elements from the receiving portion.

11. The display device as claimed in claim 10, wherein the lock structure further comprises a button element and an engaging element, the button element slidably disposed on the engaging element, and the first and second supporting elements engaging the engaging element and disengaging from the engaging element by means of the button element.

12. The display device as claimed in claim 11, wherein the first supporting element and second supporting element further comprise a first engaging portion and a second engaging portion, respectively, to engage the engaging element.

13. The display device as claimed in claim 1, further comprising at least one first buffer disposed in the receiving portion of the base to protect the stand.

14. A display device, comprising:
   a monitor;
   a hinge body having a hinge upper portion and a hinge lower portion, the hinge upper portion rotatably connected to the monitor; and
   a stand having a first supporting element and a second supporting element, the first supporting element having a first rotating end and a first free end, the second supporting element having a second rotating end and a second free end, the first and second rotating ends rotatably connected to the hinge lower portion, the first free end and the second free end respectively having a first inclined surface and a second inclined surface;
   wherein, when the first and second supporting elements rotate away from each other, the angle between the first and second supporting elements increases to a predetermined angle;
   wherein the first and second inclined surfaces stably contact a horizontal surface when the first and second supporting elements are disposed with the predetermined angle.

15. The display device as claimed in claim 14, further comprising:
   a first protruded portion formed on the monitor and having a first lateral surface; and a second protruded portion formed on the monitor and having a second lateral surface, wherein the hinge upper portion is rotatably connected to the first and second lateral surfaces.

16. The display device as claimed in claim 15, wherein the hinge lower portion is wider than the hinge upper portion to accommodate the first and second rotating ends.

17. The display device as claimed in claim 14, wherein the hinge lower portion is wider than the hinge upper portion to accommodate the first and second rotating ends.

18. The display device as claimed in claim 14, further comprising a first cushion and a second cushion disposed on the first and second inclined surfaces of the first and second supporting elements, respectively.

19. A display device, comprising:
   a monitor;
   a first protruded portion formed on the monitor and having a first lateral surface;
   a second protruded portion formed on the monitor and having a second lateral surface;
   a hinge body having a hinge upper portion and a hinge lower portion, the hinge upper portion rotatably connected to the first and second lateral surfaces; and
   a stand having a first supporting element and a second supporting element, the first supporting element having a first rotating end and a first free end, the second supporting element having a second rotating end and a second free end, the first and second rotating ends rotatably connected to the hinge lower portion;
   wherein the first and second supporting elements are capable of moving relative to each other, and the angle and distance between the first and second supporting elements change;
   wherein the hinge lower portion is wider than the hinge upper portion to accommodate the first and second rotating ends.

20. The display device as claimed in claim 19, wherein the hinge body further comprises a first fixed pin and a second fixed pin at the hinge lower portion, the first and second supporting elements pivoting to the first and second fixed pins, respectively.

* * * * *